United States Patent [19]
Takahashi et al.

[11] Patent Number: 6,013,362
[45] Date of Patent: Jan. 11, 2000

[54] SOUNDPROOF MATERIAL

[75] Inventors: Nobuyuki Takahashi; Manabu Matsunaga; Kazumasa Tanaka; Yasunori Sugihara, all of Osaka, Japan

[73] Assignee: Nitto Denko Corporation, Osaka, Japan

[21] Appl. No.: 09/022,385

[22] Filed: Feb. 12, 1998

[30] Foreign Application Priority Data

Mar. 6, 1997 [JP] Japan .................................. 9-070775

[51] Int. Cl.$^7$ .............................. G11B 23/03; H02K 5/24
[52] U.S. Cl. ...................... 428/304.4; 181/201; 181/202; 360/133; 360/900
[58] Field of Search ........................ 181/198, 201, 181/202; 248/634; 360/133, 900; 428/304.4

[56] References Cited

U.S. PATENT DOCUMENTS

| | | | |
|---|---|---|---|
| 4,181,780 | 1/1980 | Brenner et al. .......................... | 521/93 |
| 4,252,909 | 2/1981 | Honma et al. .......................... | 521/144 |
| 5,149,048 | 9/1992 | Morehouse et al. .................... | 248/632 |
| 5,207,327 | 5/1993 | Brondos .................................. | 206/523 |
| 5,377,065 | 12/1994 | Morehouse et al. .................... | 360/105 |

OTHER PUBLICATIONS

Encyclopedia of Polymer Science and Engineering, vol. 3, John Wiley & Sons, Inc., New York, p. 566, 1985.

*Primary Examiner*—Blaine Copenheaver
*Attorney, Agent, or Firm*—Sughrue, Mion, Zinn, Macpeak & Seas, PLLC

[57] ABSTRACT

A soundproof material comprising a porous member having an air permeation amount based on the pressure difference of $2.039 \times 1/10^4$ mmH$_2$O of from $1 \times 1/10^{10}$ to $2 \times 1/10^2$ cc/cm$^2$/second, and having a compressibility.

3 Claims, 1 Drawing Sheet

SOUNDPROOF MATERIAL

FIELD OF THE INVENTION

The present invention relates to a soundproof material having excellent soundproof effect, which is suitable as a equipment mounting type soundproof material for, for example, mounting between a hard disc drive body and a substrate.

BACKGROUND OF THE INVENTION

In hard disc drives in personal computers, and the like, motor sound in driving, wind sound of rotating disc, or the like generates, becoming noise to operators or device-neiboring persons. Therefore, it is attempted to reduce the generated sound by arranging a soundproof material between the drive body and the substrate.

Hitherto, foams comprising a polyurethane foam and the like have been known as the above-described soundproof material, but there is a problem that the leakage of sound is large and they are poor in the sound insulating effect. Thus, a soundproof material wherein a static spring constant of the foam is limited, a soundproof material wherein a finely uneven polymer film is formed on the surfaces of the inside walls of bubbles of the foam, a soundproof material wherein the outer surface of the foam thereof is covered with a film, a soundproof material wherein a melt blow layer of a resin and the like is laminated on a film, etc., are proposed as disclosed in JP-A-56-157347, JP-A-59-102294, JP-4-40381, JP-A-4-345834, and JP-A-7-261768 (the term "JP-A" as used herein means an "unexamined published Japanese patent application".

However, in these conventional soundproof materials, the sound insulating effect is insufficient, a satisfactory sound proof of noises cannot be achieved, and in the soundproof material having formed a fine-uneven polymer film, etc., there is a problem that the production step is complicated and the production efficiency is poor.

SUMMARY OF THE INVENTION

An object of the present invention is to provide a soundproof material which can be easily applied to a narrow space, etc., and is excellent in the sound insulating effect and in the production efficiency.

According to the present invention, there is provided a soundproof material comprising a porous member having an air permeation amount based on the pressure difference of $2,039 \times 1/10^4$ mmH$_2$O of from $1 \times 1/10^{10}$ to $2 \times 1/10^2$ cc/cm$^2$/second, and having a compressibility.

In the above-described soundproof material of the present invention, the limitation of the air permeation amount of the porous member shows the critical effect difference in the absorption and the transmission of sound. If the air permeation amount is less than $1 \times 1/10^{10}$ cc/cm$^2$/second, the absorbing property of sound is poor and it is difficult to exhibit the sound deadening effect, while if the gas permeation amount exceeds $2 \times 1/10^2$ cc/cm$^2$/second, the sound insulating effect by reflection is poor, a sound is liable to transmit to give a large leaked sound, and it is difficult to exhibit the sound deadening effect.

Also, in the above-described soundproof material, by using a porous member having an acoustic absorptivity based on the frequency of 3.15 kHz of at least 20%, the sound deadening effect is greatly improved, and also by using the porous member having a repulsion stress at a 50% compression of from 10 to 200 gf/cm$^2$, the soundproof material can be easily mounted even in a narrow space, etc., while preventing the deformation, etc., of the adjacent member, and the soundproof material can be easily produced.

DETAILED DESCRIPTION OF THE INVENTION

Figure 1:
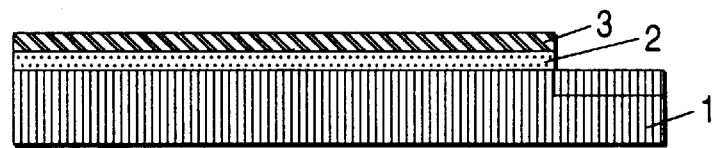
FIG. 1 is a cross-sectional view showing one application embodiment of the soundproof material according to the present invention.

The present invention is described in detail below.

The soundproof material comprising a porous member having an air permeation amount based on the pressure difference of $2.039 \times 1/10^4$ mmH$_2$O of from $1 \times 1/10^{10}$ to $2 \times 1/10^2$ cc/cm$^2$/second, and preferably from $1 \times 1/10^9$ to $1 \times 1/10^2$/second, and having a compressibility.

The porous members used in the present invention can be any materials so long as it shows the above-described characteristics. Examples of the porous member which can be used include a fiber assembly formed by assembling natural or synthetic, and organic or inorganic fibers in, for example, a nonwoven fabric form, an olefin foam, a urethane foam, an acrylic foam, a vinyl chloride foam, a styrene-butadiene rubber (SBR) foam, a butadiene rubber (BR) foam, an acrylonitrile-butadiene rubber (NBR) foam, and a foam of the blend thereof. Those are appropriately selected.

The soundproof material may be formed as a laminate or a mixed layer of 2 or more kinds of the porous members. In addition, it is preferred that at least 30% of cells of the foam has an open cell structure from the points of the soundproof effect and the deformation prevention.

The porous materials which can be preferably used in the present invention from the above-described conditions, etc., include EPDM foams comprising copolymers comprising ethylene, an α-olefin, such as propylene or butene-1, and a cyclic or acyclic polyene having a non-conjugated double bond, such as dicyclopentadiene or ethylidene norbornene, copolymers comprising 45 to 70 mol % of ethylene, 5 to 20 mol % of the α-olefin, and 50 to 10 mol % of the polyene, and more preferably copolymers having a Mooney viscosity ML$_{1+2}$ (100° C.) of 30 to 110.

Rubber foams which use the above-described EPDM together can also preferably be used. In this case, an appropriate rubber component, such as a natural rubber, a butyl rubber, a chloroprene rubber, an acrylic rubber, a styrene-butadiene rubber, or a nitrile-butadiene rubber can be used as a rubber component other than EPDM. In addition, the amount of EPDM used is preferably 20% by weight or more based on the weight of the total rubber components from the standpoints of the weather resistance and the durability.

The production of the foam, such as the EPDM foam, satisfying the above-described conditions defined in the present invention can be carried out by a method such that a mixture obtained by blending appropriate additives, such as a foaming agent, or a vulcanizing agent, with a rubber component is molded into a sheet, the sheet is subjected to a foaming and vulcanizing treatment, and a physical property-controlling treatment, such as breaking a part or the whole of cells by an appropriate means, such as a compression treatment, is applied to the foamed sheet.

Example of the foaming agent which can be used include azo foaming agents, such as azodicarbonamide; N-nitroso foaming agents, such as dinitrosopentamethylenetetramine; inorganic foaming agents, such as sodium hydrogencarbonate; semicarbazide foaming agents, such as 4,4'-oxybis(benzenesulfonylsemicarbazide); hydrazine foaming agents, triazole foaming agents and the like. The amount of the foaming agent used is preferably 5 to 50 parts by weight per 100 parts by weight of the rubber component from the point of the foaming magnification for obtaining the desired properties.

Appropriate compounds can be used as the vulcanizing agent. Examples of the vulcanizing agent include sulfur, p-quinonedioxime, p,p'-dibenzoylquinonedioxime, 4,4'-dithiodimorpholine, p-dinitrosobenzene, ammonium benzoate, and N,N'-m-phenylenedimaleimide. The amount of the vulcanizing agent used is preferably from 1 to 30 parts by weight per 100 parts by weight of the rubber component from the standpoints of obtaining the desired properties of preventing occurrence of the foaming hindrance such as the insufficient vulcanization, a gas leakage, etc.

In preparing the above-described mixture, if necessary, an appropriate foaming aid, such as an urea foaming aid, a salicylic acid forming aid, or a benzoic acid foaming aid, and also an appropriate vulcanizing aid, such as an aldehyde ammonia vulcanizing aid, an aldehyde amine vulcanizing aid, a thiourea vulcanizing aid, a guanidine vulcanizing aid, a thiazole vulcanizing aid, a sulfenamide vulcanizing aid, a dithiocarbamate vulcanizing aid, and a xanthate vulcanizing aid may be used.

Further, other additives, for example, a filler made of calcium carbonate, talc, clay, a mica powder, a metal hydroxide (e.g., aluminum hydroxide and magnesium hydroxide), a metal oxide (e.g., aluminum oxide and zinc oxide), and a softening agent, such as a paraffin softening agent, a naphthene softening agent, an aromatic softening agent, or an asphalt softening agent, can be, if necessary, compounded in preparing the mixture.

In the above-described additives, the amount of the filler used is from 30 to 300 parts by weight per 100 parts of the rubber component from the point of controlling the properties such as the strength and the like. Also, the amount of the softening agent used is 10 to 300 parts by weight per 100 parts by weight of the rubber component from the point of controlling the viscosity of the mixture, which relates to a foaming property, and the preventing property of blooming.

The foam, such as the above-described EPDM foam, used in the present invention is preferably a foam prepared by spreading the above-described mixture on, for example, a release liner at a thickness of 0.5 to 50 mm and heat-treating the spread mixture at a temperature of 100 to 200° C. for 10 to 60 minutes to subject the spread mixture to a foaming and vulcanizing treatment such that the foaming ratio is 3 to 20 times, preferably 5 to 15 times, and more preferably 8 to 13 times. If the foaming ratio is less than 3 times, the compressive repulsion force of the soundproof material is large and it becomes sometimes difficult to arrange the soundproof material in a narrow space, etc. On the other hand, if the foaming ratio exceeds 20 times, it is difficult to control the air permeation amount and a satisfactory soundproof property may not obtained.

The porous member which can be preferably used in the present invention includes open cell foams having a specific gravity of 0.01 to 0.9, and preferably 0.016 to 0.1, comprising appropriate thermoplastic resins, such as polyurethane, polyethylene, or polyvinyl chloride, or appropriate rubber polymers, such as a butyl rubber, or an isoprene rubber, impregnated with an appropriate resin, such as an acrylic resin, a polybutyral resin, or a polyester resin, thereby having the above-described air permeable properties. In this case, the amount of the resin impregnated can appropriately be determined according to the air permeable properties. The amount thereof is generally about 0.01 to 1.0 g/cm$^2$, and preferably about 0.02 to 0.1 g/cm$^2$.

The porous member which can be preferably used from the point of the sound deadening effect, etc., has the acoustic absorptivity based on the frequency of 3.15 kHz of at least 20%, preferably at least 25%, and more preferably at least 30%. From the point of the mounting property in a narrow space, etc., it is preferable for the porous material to have the compression characteristics that the repulsion stress at the 50% compression is 10 to 2000 gf/cm$^2$, preferably from 20 to 150 gf/cm$^2$, and more preferably from 30 to 120 gf/cm$^2$.

The form of the soundproof material of the present invention can be appropriately determined according to the purposes of use, such as the applying portion, and the thickness thereof is also optional. In general, the thickness of the soundproof material is 100 mm or less, preferably 0.5 to 70 mm, and more preferably 1 to 40 mm, in terms of an apparent thickness. It is not required for the soundproof material to have a uniform thickness, and the thickness may be partially different.

The soundproof material having a partially different thickness can be efficiently formed by, for example, a method which comprises crushing the porous member into a flake form to obtain chips, coating surfaces of the chips with an adhesive, filling the chips in a mold, and press-molding the chips.

The soundproof material of the present invention can be used for various soundproofing treatments according to conventional methods, for example, a method of interposing the soundproof material previously formed into the desired forn between various members, e.g., between a hard disc drive body 1 and a substrate 3 as shown in FIG. 1, or a method of applying the soundproof material formed in a tape form, a sheet form, etc., by an appropriate method such as a winding method, an adhering method, etc. In FIG. 1, 2 is a soundproof material.

The present invention is described in more detail by reference to the following examples, but it should be understood that the invention is not costrued as being limited thereto. Unless otherwise indicated, all percents, parts, ratios, and the like are by weight.

EXAMPLE 1

100 Parts of EPDM having a Mooney viscosity $ML_{1+2}$ (100° C.) of 65, composed of 60 mol % of ethylene, 10 mol % of propylene, and 30 mol % of polyene, 200 parts of heavy calcium carbonate, 50 parts of a paraffin oil, 15 parts of an ADCA organic foaming agent, and 2.5 parts of sulfur were kneaded in a kneader. The resulting kneaded mixture was spread on a release liner at a thickness of 10 mm, and heated at 160° C. for 30 minutes to foam and vulcanize the same, thereby obtaining a closed cell foam having a foaming ratio of 8 times.

The foam thus obtained was passed between rolls having a gap of ⅓ the thickness of the foam and sliced at a thickness of 2 mm to obtain a soundproof material having an air permeation amount based on the pressure difference of $2.039 \times 1/10^4$ mmH$_2$O (hereinafter the same) of $1.0 \times 1/10^4$ cc/cm$^2$/second.

The air permeation amount was obtained by measuring an air permeation amount using a Frazil-type test machine according to JIS L1096 under a pressure optionally selected, and calculating the air permeation amount at the pressure difference of $2.039 \times 1/10^4$ mmH$_2$O by inducing an approximate equation from the relationship between the selected pressure and the air permeation amount obtained.

EXAMPLE 2

A ether urethane foam (commercially available product) having a specific gravity of 0.03 and an apparent thickness of 2 mm was impregnated with an impregnating agent obtained by compounding 100 parts of a copolymer composed of 95% of butyl acrylate and 5% of acrylic acid with 10 parts of an isocyanate crosslinking agent in a proportion of 0.05 g/cm² in terms of the solid content, and heated to 150° C. for 30 minutes to obtain a soundproof material having an air permeation amount of $1.0 \times 1/10^4$ cc/cm²/second.

COMPARATIVE EXAMPLE 1

A soundproof material having an air permeation amount of $5.6 \times 1/10^2$ cc/cm²/second was obtained in the same manner as in Example 1 except that the closed-cell foam was passed between rolls having a gap of ½ the thickness of the foam.

COMPARATIVE EXAMPLE 2

A soundproof material having an air permeation amount of $4.3 \times 1/10^{11}$ cc/cm²/second was obtained in the same manner as in Example 1 except that the closed-cell foam was passed between rolls having a gap of ¼ the thickness of the foam.

COMPARATIVE EXAMPLE 3

A soundproof material having an air permeation amount of $8.6 \times 1/10^2$ cc/cm²/second was obtained in the same manner as in Example 2 except that the proportion of the impregnationg agent impregnated was changed to 0.008 g/cm².

COMPARATIVE EXAMPLE 4

A soundproof material having an air permeation amount of less than the measurable limit (air impermeability) was obtained in the same manner as in Example 1 except that the proportion of the impregnating agent impregnated was changed to 2.0 g/cm².

EVALUATION TEST

Acoustic Absorptivity:

The acoustic absorptivity of each of the soundproof materials obtained in the above examples and comparative examples was measured by a normal incident sound absorption coefficient according to JIS A 1405.

50% Compressive Repulsion Force:

Each of the soundproof materials obtained in the above examples and comparative examples was compressed to a thickness of 50% of the original thickness at a speed of 100 mm/minute, and the repulsion force after passing 10 seconds since then was determined.

Figure 2:
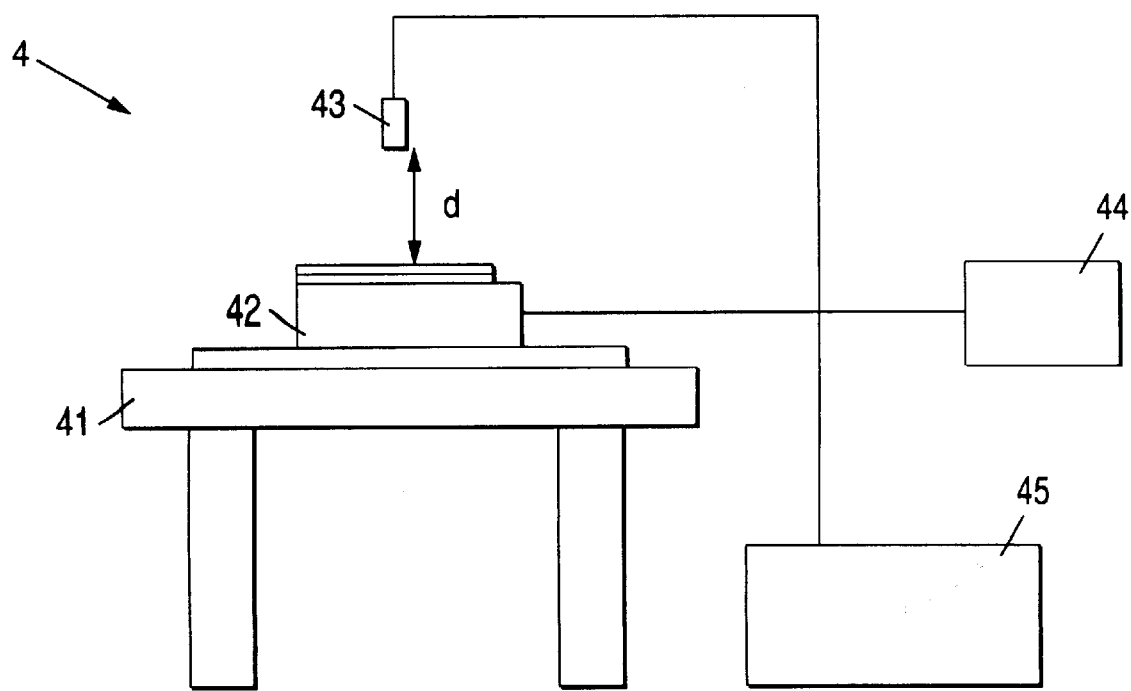
FIG. 2 is a view explaining a sound measuring test.

Generated Sound:

As shown in FIG. 2, each of the soundproof materials obtained in the above examples and comparative examples was mounted between a hard disc drive body and a substrate, the assembly 42 formed was placed on a stand 41 placed in a non-acoustic chamber, a sound generating apparatus 42 was driven by a driving source 44, and the sound generated was measured by a microphone 43 disposed above the assembly 42 at a distance of 300 mm (d), through an analyzer 45.

The results obtained by the above measurements were shown in the Table below. Sound level where the soundproof material was not used was shown as blank.

TABLE

| | Gas Permeation Amount (cc/cm²/sec) | Acoustic Absorptivity (%) | 50% Compression Repulsion Force (gf/cm²) | Generated Sound (dB) |
|---|---|---|---|---|
| Blank | — | — | — | 44.6 |
| Example 1 | $1.0 \times 1/10^4$ | 35 | 44 | 36.5 |
| Example 2 | $1.0 \times 1/10^4$ | 32 | 44 | 37.0 |
| Comparative Example 1 | $5.6 \times 1/10^2$ | 35 | 38 | 38.2 |
| Comparative Example 2 | $4.3 \times 1/10^{11}$ | 35 | 250 | 36.4*[1] |
| Comparative Example 3 | $8.6 \times 1/10^2$ | 35 | 52 | 39.6 |
| Comparative Example 4 | Less than measurable limit | 28 | 280 | Mounting impossible*[2] |

Notes:
*[1]Substrate was deformed due to large compressive repulsion force
*[2]Mounting was impossible due to large compressive repulsion force.

As described above, according to the soundproof material of the present invention, the sound energy entered the porous member is absorbed as a vibration energy, etc., and is converted into a heat energy, etc., whereby a sound deadening effect is obtained. In this case, depending on the air permeation amount, the sound which cannot be absorbed is reflected in the inside of the porous member, whereby the sound leaking outside is largely restrained to give an excellent sound interrupting effect, and a high prevention of noise can be achieved. Also, because the soundproof material of the present invention is comprised of a porous member having a compressibility, the soundproof material is excellent in the production efficiency, can be easily mounted in narrow spaces, etc., and can restrain large-sizing of the whole apparatus by decreasing thickness of a soundproof material.

While the invention has been described in detail and with reference to specific embodiments thereof, it will be apparent to one skilled in the art that various changes and modifications can be made therein without departing from the spirit and scope thereof.

What is claimed is:

1. A hard disc drive comprising:
    a hard disc drive body,
    a substrate, and
    a soundproof material comprising a compressible porous member which comprises a foam wherein:
    (1) an air permeation amount based on the pressure difference of $2.039 \times 1/10^4$ mmH$_2$O is from $1 \times 1/10^{10}$ to $2 \times 1/10^2$ cc/cm²/second,
    (2) at least 30% of cells of the foam have an open cell structure;
    (3) the foam has a foaming ratio of 3 to 20 times; and
    (4) the foam contains EPDM, interposed between the hard disc body and the substrate.

2. A hard disc drive as claimed in claim 1, wherein the soundproof material has an acoustic absorptivity at a frequency of 3.15 kHz of at least 20%.

3. A hard disc drive as claimed in claim 1, wherein the soundproof material has a repulsion stress at 50% compression of 10 to 200 gf/cm².

* * * * *